Nov. 5, 1968   J. P. GENTRY ET AL   3,409,444
DEVICE AND METHOD FOR TREATING PICKED GRAPES
Filed May 14, 1965

INVENTORS
Joe P. Gentry
Klayton E. Nelson
BY
Lothrop & West
Attorneys

United States Patent Office 3,409,444
Patented Nov. 5, 1968

3,409,444
DEVICE AND METHOD FOR TREATING PICKED GRAPES
Joe P. Gentry and Klayton E. Nelson, Davis, Calif., assignors to The Regents of the University of California, Berkeley, Calif.
Filed May 14, 1965, Ser. No. 455,709
15 Claims. (Cl. 99—156)

Our invention relates primarily to means for preserving picked grapes substantially in their picked condition over a protracted period of time by a satisfactory method of fumigating the grapes while they are held in a manually portable box or container.

In the usual large scale method of keeping grapes from deteriorating after they have been picked, it is customary to place the picked grapes in open lug boxes or comparable containers and to bring them to a central point at which they can be stored in a substantially closed room. Sulphur dioxide gas is furnished to the room and enters through and into the containers, passing in between the various grapes therein. This gas treatment, periodically repeated, is effective to keep the grapes for a reasonable length of time under cold storage conditions, but care must be taken not to provide excessive gas treatment since this tends to injure the grapes and reduces their marketability. Likewise, gas treatments must be given in sufficient numbers and in sufficient strength to ensure that the grapes are appropriately preserved. Other gases than sulphur dioxide can be utilized, but there are often restrictions, such as a governmental prohibition, against the commercial use of other gases. Consequently, there is reference herein to sulphur dioxide only, but it is to be understood that other gases and other preservative materials can be used without technical difficulty and subject only to approval by governmental authorities.

It is noted that grapes in being picked and in being initially handled are susceptible to mechanical damage such as splits or cuts or abrasions. These are excellent sites for the entry of bacteria and micro-organisms causing rapid deterioration in the injured grape berry. While these incursions can be arrested and their effects minimized by suitable treatment with gas, usually any bulk treatment to an extent sufficient to compensate for mechanical injury is so great as to destroy the marketability and desirable qualities of the uninjured grapes.

It is therefore an object of our invention to provide a greatly improved device and method for treating picked grapes in order to preserve them.

Another object of the invention is to provide an improved device for treating picked grapes in relatively small quantities and with appropriate dosages of treating gas.

Another object of the invention is to provide a method for treating picked grapes, the steps of which are effective to provide a final product substantially improved over presently available end products.

Another object of the invention is to provide a device for treating picked grapes which can be readily utilized in the present channels of trade.

Another object of the invention is to provide a device for treating picked grapes which is readily acceptable to new users and has no requirement for special knowledge or special handling for the device or for the treatment.

A still further object of the invention is to provide a device for treating picked grapes which affords an attractive appearance of the product and in fact an improved appearance over products of similar age treated by presently available methods.

Other objects together with the foregoing are attained in the embodiment of the invention described in the accompanying description and illustrated in the accompanying drawings, in which.

Figure 1:
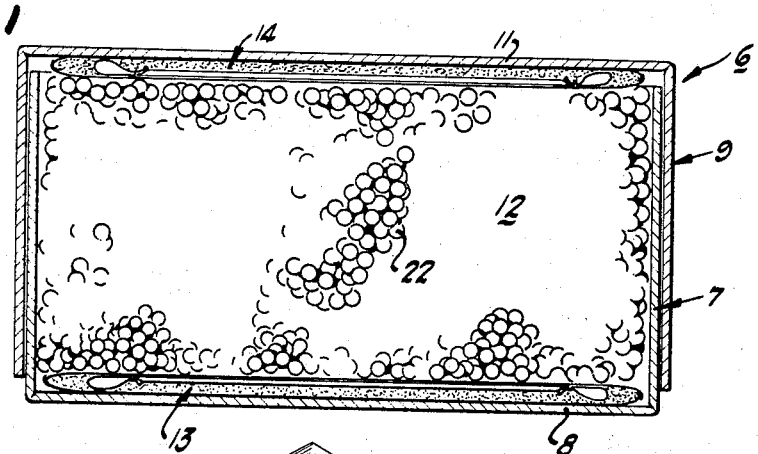
FIGURE 1 is a cross section on a transverse vertical plane through a container of picked grapes arranged in accordance with the invention.

In providing a device pursuant to the invention and in carrying out the method thereof, there is preferably afforded a container 6 or box having a lower section 7 with a bottom 8 and having a telescoping upper section 9 with a cover 11. The container is preferably generally rectangular in all views and is fabricated of fiberboard or like material such as corrugated sheet which preferably has some sort of a coating such as paraffin or polyethylene, particularly on the inside surfaces thereof. The upper section 9 fits with close tolerances on the lower section 7 so that the container parts can readily be assembled and disassembled but so that there is very little opportunity for air flow between the external atmosphere and the interior 12 of the container.

While the container 6 is not absolutely air tight and some leakage can occur, this container is normally referred to as an unvented or closed container and is distinguished from lug boxes and the like presently utilized. These are especially made of open work or are perforated to afford ready and easy circulation of gas from the exterior into and through the container. In contradistinction to the presently used, open or free flowing arrangement, our container 6 is virtually closed. Actually, the container 6 can be sealed with tape around its edges to make it completely air tight, if desired, but it has been found in practice that such extra step is not usually necessary and can be entirely dispensed with in the ordinary instance. The size of the container 6 is usually such that when loaded with grapes it can readily be moved by ordinary manual handling for ordinary transportation and for display in a market.

Figure 2:
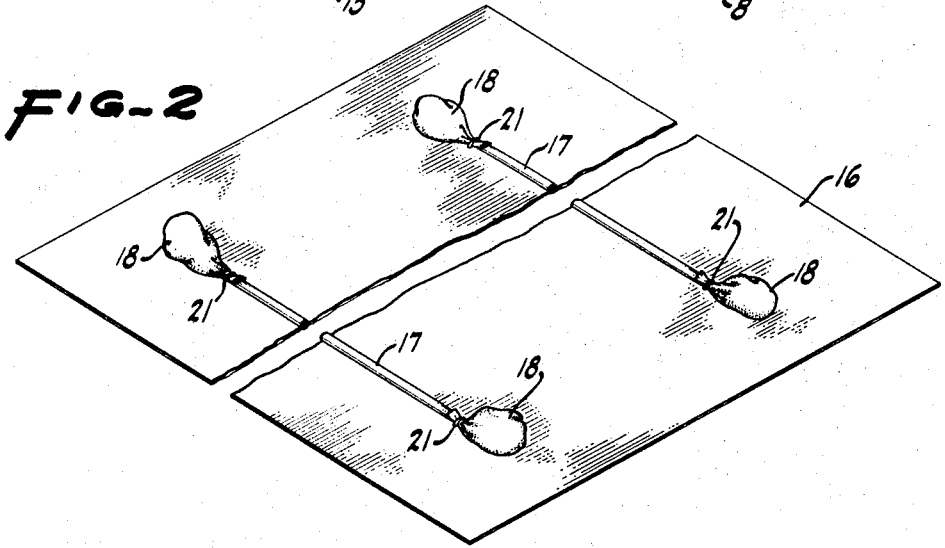
FIGURE 2 is a perspective view, a portion being broken away to reduce the size of the figure, showing a liner together with accompanying devices for use in one form of the invention.
Figure 3:
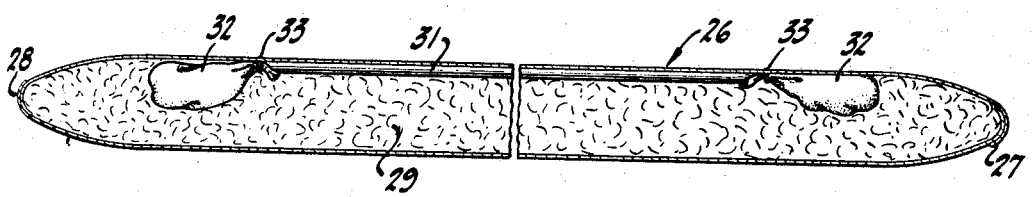
FIGURE 3 is a cross section to an enlarged scale of a pad constructed in accordance with the invention and carrying certain treating devices within it, a portion of the pad being broken away to reduce the size of the figure.
Figure 4:
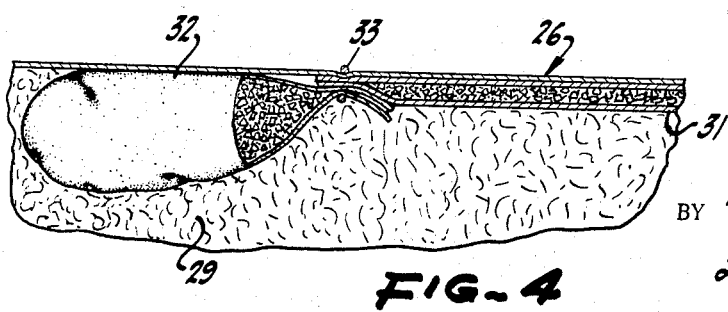
FIGURE 4 is a cross section similar to the left end of FIGURE 3 but drawn to an enlarged scale and with parts broken away to show the interior construction.

In accordance with the invention, the container 6 is provided with certain inserts 13 and 14. One of these is disposed at the bottom 8 of the container under the lading and the other one is disposed at the top of the container over the lading therein. In one form of the invention, the insert can take the form of a liner comprised of a planar sheet 16, for example of paper, having very little resilience and cushioning power but serving as a base for the reception of certain containers or envelopes 17 and 18. Conveniently, as shown in FIGURE 2, the sheet 16 at symmetrical points carries a pair of elongated tubular envelopes 17, to the opposite ends of each of which is fastened a pair of envelopes 18. The envelopes 18 are preferably entirely closed and are made up of paper tissue such as the customary facial tissue. This is used in commercial form and is substantially untreated. It is very cheap and light. It is readily permeable by moisture and is readily permeable by various gases, particularly sulphur dioxide.

The envelope 17 is of similar construction in that it is closed and is made of paper material. But in this instance, the paper of the envelope 17 has some sort of coating, for example a wax coating. The coating of the envelope 17 makes the envelope very slowly permeable to moisture, although it nevertheless remains readily permeable to sulphur dioxide or comparable gas.

It is also possible to make the envelope 17 of a material such as polyvinyl chloride or a material such as polyethylene, providing the thickness and other characteristics of the material are appropriate to act about as waxed paper does.

The interior of the envelope 17 and the interior of the envelope 18 are substantially filled with a material, preferably in granular form, effective in the presence of moisture, particularly moisture given off by grapes, to evolve an appropriate disinfecting gas. In the case of sulphur dioxide, it is appropriate to fill the envelopes 17 and 18 with sodium bisulfite. Conveniently, the envelopes 17 are first filled, the envelope 18 are filled thereafter and placed around the ends of the envelopes 17 for mechanical support and strength, and then the assembly so made is fastened to the liner 16 by appropriate clips 21 either of inactive metal or of plastic material. The effect of the clips 21 is mechanically to secure the various envelopes to the sheet 16 and also firmly to close the envelopes, one with respect to the other, so that there is no intercommunication between the envelope 17 and the envelopes 18. If it is preferred to use some fastener other than clips, an appropriate adhesive will hold the envelopes closed and in position. A similar arrangement is provided in a parallel location on the sheet 16 so that an entirely symmetrical disposition of the envelopes is afforded.

In the use of this arrangement, the liner 16 is placed within the carton 6, preferably on the bottom thereof, and then the carton is filled with picked grapes 22 in the usual way. If desired, after the grapes have been put into the carton, a second sheet 16 with its attached envelopes is placed on top of them.

In a preferred version of the invention, the liner 16 is more elaborate and comprises a sleeve 26, usually of untreated paper, folded over at the ends 27 and 28 to provide an enclosure of substantial thickness. The sleeve is filled with a stuffing 29 of any various materials such as excelsior, shredded paper, redwood bark or the like. The liner thus becomes in effect a pad having a substantial cushioning quality or a resilience to accommodate irregularities and to afford shock absorbing characteristics. The pad 26 on its interior is provided with a pair of envelopes 31 very much like the envelope 17. Each of the envelopes 31 at each end is provided with additional envelopes 32 very much like the envelopes 18. Each pad preferably has a pair of envelopes 31 in it and four of the envelopes 32 so that there is a uniform or symmetrical distribution of these devices within the pad. The envelopes 31 and 32 are filled, as before, and are closed and secured by clips 33 like the clips 21 on the inside of the pad. The envelopes 31 and 32 are not visible within the confines of the sleeve 26 and particularly are cushioned, are mechanically protected, and do not make external irregularities.

With this version, the box 6 is first provided with a pad 26 at the bottom, as shown in FIGURE 1, to serve as a holding and positioning and protecting device for the envelopes 31 and 32 and to serve as a cushion for the grape lading 22 added to the interior 12 of the container. The pad acts as a cushion and a protector for the grapes and also as a cushion and protector for the envelopes. The lading is loaded into the box in the customary fashion. When the box is full, a top pad 26 is placed on the lading. The upper section 9 is then properly positioned. The result is a virtually air tight container or at least a container affording an isolated interior atmosphere.

Under these conditions, the grapes give off moisture. If the form of device using a sleeve 26 is used, some of this moisture promptly passes through the sleeve into the interior of the pad. In both forms of device, some of this moisture passes quickly into the envelopes 18 and 32. This is because these envelopes are relatively thin and porous, are not treated with moisture inhibitors and are readily moisture permeable. But the envelopes 31, being moisture protected, are not readily penetrated by the moisture initially available. The moisture comes into contact with the sodium bisulfite within the envelopes 18 and 32 within a very short time, for example within thirty minutes to an hour from the time that the container is closed. The effect of this is that the approximately two-tenths of a gram of sodium bisulfite in each of the envelopes 18 or 32 begins to react with the moisture to give off sulphur dioxide gas. This gas then readily diffuses through the walls of the envelopes 32 (and also through the walls of the sleeve 26, if used) into immediate contact with the grapes. The container 6 is virtually gas tight and little or no gas passes through the walls thereof or escapes therefrom.

The initial gas treatment is designed to be particularly effective with respect to any cuts or openings or mechanical bruises in the grapes and promptly disinfects such areas to avoid the spread of secondary damage and to inactivate microorganisms which might otherwise readily enter and cause spoilage. The amount of the initial gassing, however, is too much to be tolerated over a protracted period, so that the materials for the initial gassing are used up or are of diminished effect after a predetermined time. But at about this time, gas begins to be released through the secondary envelopes 17 and 31. These are very slowly permeable to the moisture since their surface treatment affords only a poor path for the moisture. Moisture in significant quanity penetrates the secondary envelopes 17 and 31 only after a relatively long time, for example a time of the order of two days from the time of closure of the carton or perhaps as long as three or four days after the closure of the carton. At that time, moisture penetrating to the inside of the envelopes 17 and 31 then cause evolution of sulphur dioxide gas from the contained sodium bisulfite. This second emanation of gas also travels freely from the envelopes 17 and 31 through the walls of the pad, if used, since they are readily gas permeable, into the lading within the enclosure 12. The later developed gas serves continually and for a relatively long time to afford an atmosphere which spoilage of the grapes is greatly inhibited. The evolution of gas from the material within the secondary envelopes 17 and 31 is slow enough because of the slow access of moisture so that the initial charge on each such envelopes, for example eighty-five hundredths of a gram, is effective to preserve the boxed grapes in storage at 31° F. for a period of at least three to four weeks.

It has been found possible by extensive tests within a closed container arranged as defined herein to provide, at least at the end of three or four weeks, grapes in which the berries are in excellent, edible, condition and have good appearance. The stems are not shrunken nor dried and have not turned brown as they otherwise do. The stems actually stay green or perhaps bleach slightly over the cold storage period. When the fruit is ultimately unpacked, it has an attractice, saleable appearance.

In unpacking the product, the upper section 9 is removed and the top liner 16 or pad 26 is picked off and thrown away. This easily and automatically disposes of this portion of the gassing structure, specifically the envelopes 17 and 18 or the envelopes 31 and 32. The user, therefore, does not need to learn anything new in handling a container of grapes processed in the disclosed way and does not have to take any special or new steps to make the package suitable for merchandizing. The user may and need not even be aware that special means have been provided in the container for assisting in the preservation of the lading.

In some instances, there is a strong tendency to continue the use of open or slatted wooden containers. On those occasions, we provide a liner much like the liner 16 but of sufficient extent so that the entire wooden crate or container can be lined with it. There is sufficient overlapping at the top so that the container grapes, although supported by the wooden crate, are in effect isolated generally from the atmosphere and so that the folded liner provides an enclosure affording an isolated or confined atmosphere. The action of the process is substantially the same as with a container such as illustrated in FIGURE 1.

It is considered important that the various envelopes such as 17 and 18 and 31 and 32 be distributed fairly evenly within the container since their range of operation is relatively short, yet in this fashion the entire contents are treated with sufficient evenness for commercial purposes. It is also preferred to have the paper wall of a liner 16 or of a pad 26 interposed between the envelopes and the fruit so that there is no danger of any of the actual chemicals such as the granulated sodium bisulfite coming into direct contact with the lading.

While grapes have been referred to herein, it is also possible to utilize the device and method with other, comparable commodities.

What is claimed is:

1. A device for treating picked grapes comprising a container adapted when closed substantially to confine gas, a pad permeable to gas disposed within said container, a first holder readily permeable by gas and moisture disposed within said pad, a second holder readily permeable by gas and slowly permeable by moisture disposed within said pad, and materials in said first holder and said second holder adapted to evolve gas in the presence of moisture.

2. A device as in claim 1 in which said pad is cushion-like to protect said first and second holders from mechanical injury.

3. A device as in claim 1 in which said first holder is of thin, paper-like material.

4. A device as in claim 1 in which said second holder is of paper-like material treated to be at least in part moisture impermeable.

5. A device as in claim 1 in which said first holder and said second holder are closed envelopes.

6. A device as in claim 1 in which said first holder and said second holder are secured to said pad.

7. A device as in claim 1 in which a plurality of said first holders and of said second holders are evenly distributed within said container.

8. A device as in claim 1 in which said gas is sulphur dioxide.

9. A devices as in claim 1 in which said material is sodium bisulfite.

10. A device for treating picked grapes comprising a manually portable box adapted when closed substantially to confine gas, a first envelope holder readily permeable by gas and moisture disposed within said box, a second envelope holder readily permeable by gas and slowly permeable by moisture disposed within said box, and granular material in said first envelope holder and said second envelope holder adapted in the presence of moisture within said envelope holders derived from the interior of said box to release gas into said box.

11. A method for treating picked grapes comprising the steps of confining picked grapes substantially in picked condition in a restricted atmosphere providing within said atmosphere a first supply of material readily accessible to moisture evolving from said grapes and adapted in the presence of said moisture to release gas to said restricted atmosphere, and providing within said atmosphere a second supply of material only slowly accessible to moisture evolving from said grapes and adapted in the presence of said moisture to release gas to said restricted atmosphere.

12. A method for treating picked grapes comprising confining picked grapes in a restricted atmosphere in which said grapes give off moisture, providing within said restricted atmosphere a first source of material open to said moisture and in the presence of said moisture effective to release gas into said restricted atmosphere, providing within said restricted atmosphere a second source of material in the presence of said moisture effective to release gas into said restricted atmosphere, and restricting the access of said moisture to said second source of material.

13. For use in treating picked grapes, a pair of linked envelopes containing sodium bisulfite, one of said envelopes being readily pervious to moisture evolved from grapes, the other of said envelopes being only slowly pervious to moisture evolved from grapes, and both envelopes being readily pervious to gas given off by said sodium bisulfite in the presence of said moisture.

14. For use in treating picked grapes, a box liner, and a pair of closed envelopes containing sodium bisulfite secured to said liner, one of said envelopes being more pervious to moisture from grapes than the other and both envelopes being pervious to sulphur dioxide.

15. A device as in claim 14 in which said box liner is itself an enclosure of material pervious to said moisture and to sulphur dioxide and in which said envelopes are disposed within said enclosure.

References Cited

UNITED STATES PATENTS

| 2,322,493 | 6/1943 | Wilson | 99—154 |
| 3,044,885 | 7/1962 | Loehr | 99—154 |
| 3,127,274 | 3/1964 | Weinke | 99—171 |

A. LOUIS MONACELL, *Primary Examiner.*

J. M. HUNTER, *Assistant Examiner.*